Dec. 21, 1937.   H. G. SLINING   2,102,978
DISPENSER
Filed June 19, 1936

INVENTOR.
Henry G. Slining
BY Carlos G. Stratton
ATTORNEY.

Patented Dec. 21, 1937

2,102,978

UNITED STATES PATENT OFFICE 2,102,978

DISPENSER

Henry G. Slining, Huntington Park, Calif.

Application June 19, 1936, Serial No. 86,132

10 Claims. (Cl. 221—23)

My invention relates to dispensing devices and more particularly to a dispensing device adapted to remove measured quantities of dry measure from a container.

An important object of my invention is to provide a dispenser by which coffee may be removed from a can with the minimum of loss of aroma from the can.

Another object of the invention is to provide such a dispensing device that will conform with an irregular surface on the can.

The invention also comprises novel details of construction and novel combinations and arrangements of parts, which will more fully appear in the course of the following description.

In the drawing, like reference characters designate similar parts in the several views.

Figure 1:
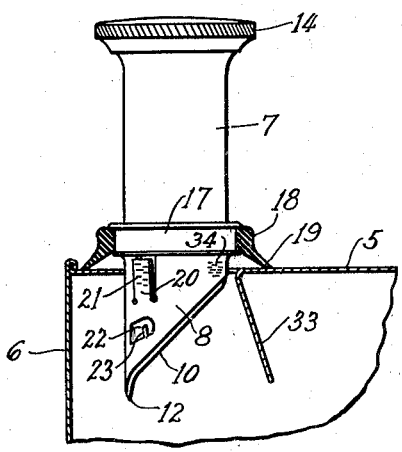
Figure 1 is an elevation of an embodiment of my invention.

Referring more in detail to the drawing, the reference number 5 designates an end of a can 6. The present invention comprises a hollow handle 7 and a spring steel cutting blade 8. The blade is circular in section with the exception of a small longitudinal gap 9. The cylindrically shaped blade is cut at a bias and the edge sharpened, to provide a cutting edge 10 that comes to a point 12.

Fitted within the hollow handle 7 is a bushing member 13 provided with a knurled head 14. The head 14 has packing 15 that provides an air-tight seal between the hollow handle 7 and the bushing 13. A threaded connection 16 is provided between the handle and the bushing.

The handle has a circumferential groove 17 in which is mounted a resilient vacuum cup 18. A lip 19 around the vacuum cup makes an air-tight, suction grip connection between the dispenser and the can 6.

The blade 8 is slit to provide outwardly sprung members 20. The spring members are nicked to provide teeth 21. The blade has inwardly bent lugs 22 which provide bearings for a spindle 23 that pivotally mounts a valve 24. The valve 24 is serrated around its circumference, as indicated at 25. A coiled spring 26 urges the valve inward to a closed position within the cutting blade 8 and a stop 27 in the blade limits such movement.

A rod 28 having a hooked end 29 is pivotally mounted in lugs 30 on the inner face of the valve. A helical spring 31 urges the end of the rod 28 against the inner surface of the bushing 13, and when the bushing is removed, the spring 31 urges the end of the rod 28 against the inner surface of the hollow handle 7.

In the use of my device, an unopened can, such as one containing coffee, is held firmly, while the cutting blade 8 is inserted through a convenient surface of the can. The point 12 pierces the can first. Then by continued inward movement of the blade, a circular disk 33 of the can is peeled backward inside the can, by means of the biased cutting edge 10. The disk 33 is not entirely severed from the can due to the gap 9 in the cutting blade.

When in position, the vacuum cup 18 sets against the surface of the can, whether regular or irregular, and the teeth 21 of the spring members 20 resiliently engage the cut edge of the can. The cutting blade may if desired also carry teeth 34 for further engagement with the cut edge of the can. The spring members 20 urge the blade 8 against the teeth 34.

Figure 5:
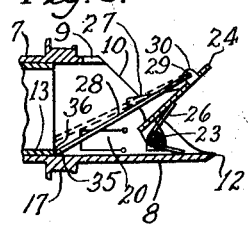
Figure 5 is a broken section, showing a step in the operation.
Figure 6:
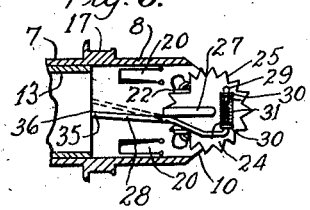
Figure 6 is a broken section, taken at right angles to Figure 5 but showing the same step in the operation.

To remove a measured amount of the contents of the can, the cap 14 and its integral bushing 13 are removed from the hollow handle 7. The spring 31 thereupon automatically moves end 35 of the rod 28 against the inner surface of the hollow handle 7. The bushing 13 is then reinserted in the handle 7, but the end 36 of the sleeve abuts against the end 35 of the rod. Continued inward movement of the bushing 13 causes the valve 24 to open, through the intermediary of the rod 28, as shown in full lines in Figures 5 and 6.

As the valve opens, a quantity of the contents of the can will fill the bushing and the inner end of the blade 8. When the contents of the can are of a character, such as ground coffee, that will pack tightly in the can, it is desirable to make several in-and-out motions of the bushing, which causes backward and forward motions of the valve. The serrations or teeth 25 around the edge of the valve cut through the tightly packed contents.

Figure 2:
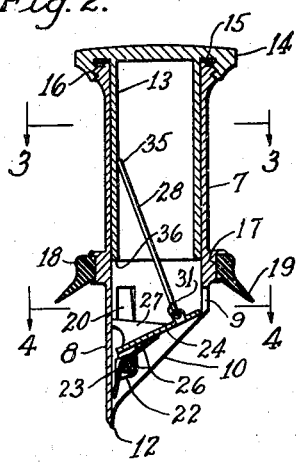
Figure 2 is a vertical section of said embodiment of my invention.
Figure 3:
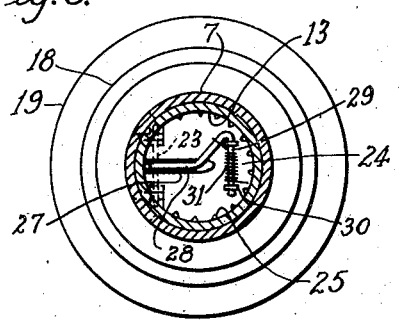
Figure 3 is a section taken on the line 3—3 of Figure 2.
Figure 4:
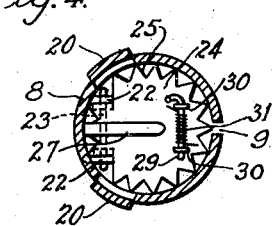
Figure 4 is a section taken on the line 4—4 of Figure 2.

In the preferred form of the invention, the valve 24 is still open when the bushing has been pushed inward to the full extent of its movement without screwing. Then the head 14 is rotated, thus causing engagement of the threads 16. The end 35 of the rod 28 abuts the end 36 of the bushing, as shown in full lines in Figures 5 and 6. Further rotation of the bushing causes the end 35 of the rod 28 to follow the turning movements of the bushing, to the position shown in broken lines in Figures 5 and 6. When the rod 28 bears against the stop 27, the end 35 snaps away from the end 36 of the bushing. The valve 24 and rod 28 thereupon assume the positions shown in Figure 2.

The valve is allowed to close by the action of the spring 26. The measured quantity that is trapped in the dispenser between the valve and the head 14 is then removed by unscrewing the handle 7. The measured content in the bushing and in the rest of the dispenser is then emptied out and the operation repeated as desired.

To remove the dispenser after the can has been emptied, rotation of the dispenser releases it.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. In a dispensing device, a hollow member carrying a blade adapted to cut an opening in a can, the hollow member being arranged to receive contents from the can through the opening cut by the blade, a removable cap for closing the hollow member, and a valve adapted to close the hollow member, the hollow member being closed at all times except for an opening into the can and except for an opening closed by the cap, and the valve and cap being spaced apart to trap a measured quantity of the contents of the can.

2. In a dispensing device, a hollow member and a cutting blade, the hollow member and the blade being axially alined and being open end to end, a removable cap for one end of the hollow member, and a valve in the device arranged to close the other end of the hollow member to trap therein contents from the can.

3. In a device for dispensing dry material from a can, a hollow member carrying an edge adapted to cut into a can, a valve operatively supported in the hollow member, the valve having a toothed edge for cutting through and loosening dry material in a can, and a removable cap for the hollow member.

4. In a dispensing device, a hollow cutting blade provided with a spring member having a portion projecting outwardly from the blade, said portion of the spring being arranged to engage an opening in a can cut by the blade, to resiliently hold the device in position in said opening, resilient means apart from the spring member arranged to resiliently resist inward movement of the blade and spring member into the can to a point spaced from the end of the outwardly projecting portion of the spring member, and a removable cap for closing the hollow blade.

5. In a dispensing device, a hollow member having an edge for cutting an opening in a can, a removable cap for closing an end of the hollow member, a valve in the hollow member and spaced from the cap to trap a measured quantity of material between the cap and the valve, spring means urging the valve to a closed position with regard to the hollow member, and means to operate the valve exteriorly of the can when the device is in position.

6. In a dispensing device, a hollow handle providing a passage therethrough, a cutting blade on the handle, a valve controlling the passage through the handle, a cap closing the passage and arranged to trap material between the valve and the cap, a bushing on the cap disposed concentric with the hollow handle, a rod on the valve arranged in the path of the bushing, whereby movements of the bushing operates the valve, and spring means urging the rod into the path of the bushing.

7. In a dispensing device, a hollow member having an edge for cutting an opening in a can, the hollow member providing a passage therethrough for the discharge of contents from the can, a cap for closing the said passage, a valve on the hollow member but spaced from the cap to trap contents of the can therebetween, spring means urging the valve to a closed position with regard to the hollow member, a stop limiting the closing movement of the valve, a rod operatively connected with the valve, a sleeve on the cap disposed concentric with the hollow member, and spring means urging the rod into the path of the sleeve, whereby the rod follows rotary movement of the sleeve, the stop means for the valve being disposed to limit the movement of the rod in following rotation of the sleeve, whereby the rod is released by engagement with the stop, allowing the valve to be closed by its spring means.

8. In a dispensing device, a blade adapted to cut an opening in a can, means carrying the blade and arranged to receive and retain a measured quantity of material through the opening cut by the blade, and a valve arranged to close said opening and to trap in said means a measured quantity of the contents from the can, said means being otherwise closed during the step of trapping a measured quantity therein.

9. In a dispensing device, a hollow member having cutting means projecting therefrom for opening a can, the hollow member being entirely closed except for an open end for leading into an opened can and except for an external opening for valve operating means, valve means to close the opening leading into an opened can, to trap a quantity of material in said member, and valve operating means extending through said external opening, to externally operate the valve.

10. In a dispensing device, a hollow member having projecting cutting means for insertion into a container, the hollow member being entirely closed except for an opening for leading into the container, spring urged valve means for closing the said sole opening of the hollow member, the valve being connected to be pre-set in an open position prior to the insertion of the device into the container, and means to release the valve after insertion of the device into the container, whereby the springs closes the valve, to trap a quantity of material in said member.

HENRY G. SLINING.